United States Patent [19]

Nakamura et al.

[11] Patent Number: 4,966,648

[45] Date of Patent: Oct. 30, 1990

[54] PROCESS FOR PRODUCING THIN FILM MAGNETIC HEAD

[75] Inventors: Tsuneo Nakamura, Nara; Kazuyoshi Imae, Higashiosaka; Haruhiko Deguchi; Tohru Kira, both of Tenri, all of Japan

[73] Assignee: Sharp Kabushiki Kaisha, Japan

[21] Appl. No.: 370,181

[22] Filed: Jun. 23, 1989

[51] Int. Cl.⁵ .................. B44C 1/22; B29C 37/00; C03C 15/00; C03C 25/06

[52] U.S. Cl. .................. 156/643; 29/603; 156/646; 156/651; 156/655; 156/668; 204/192.36; 427/131

[58] Field of Search .............. 156/643, 646, 651, 652, 156/655, 657, 659.1, 668; 252/79.1; 204/192.32, 192.35, 192.36, 192.37; 427/38, 39, 127–132; 360/110, 119, 122, 123, 125, 127; 29/603; 430/313, 314, 315, 317

[56] References Cited

U.S. PATENT DOCUMENTS

| | | | |
|---|---|---|---|
| 4,592,801 | 6/1986 | Hara et al. | 156/643 |
| 4,597,826 | 7/1986 | Majima et al. | 156/643 |
| 4,710,263 | 12/1987 | Kato | 156/656 X |
| 4,841,624 | 6/1989 | Togawa et al. | 29/603 |

Primary Examiner—William A. Powell

[57] ABSTRACT

An improved process for producing a thin film magnetic head includes forming a nonmagnetic material layer over a lower magnetic core layer with an electrically conductive coil layer embedded in the nonmagnetic material layer. It further includes forming an upper magnetic core layer of a predetermined pattern by a specific method over the resultant to provide the thin film magnetic head.

16 Claims, 4 Drawing Sheets

PROCESS FOR PRODUCING THIN FILM MAGNETIC HEAD

BACKGROUND OF THE INVENTION

1. Field of the Invention

The present invention relates to a process for producing thin film magnetic heads. More particularly the invention relates to a process for producing a thin film magnetic head for use in writing data on or reading data from magnetic recording media such as magnetic tapes or magnetic discs, the head being suited especially to high-density recording.

2. Description of the Prior Art

Thin film magnetic heads have the features of being small-sized, assuring facilitated recording of data with a high density in a multiplicity of channels and being adapted to form tracks of more accurate and reduced width. They are small in inductance, low in core loss and therefore excellent in radio-frequency characteristics, and have the ability for recording with high resolution because they produce a sharp magnetic field distribution. In addition to these features in characteristics, these magnetic heads are amenable to mass production at a greatly reduced cost. With the requirement for high-density magnetic recording in recent years, thin film magnetic heads have proved remarkably superior because of these features, and active research and development efforts have been made in this field (U.S. Pat. No. 4,677,036, etc.).

The main construction of such a thin film magnetic head will be described with reference to FIG. 3.

A substrate 1 has formed thereon a lower magnetic core layer 2. The substrate 1 is made of a material having high wear resistance, such as ferrite, alumina or glass. The lower magnetic core layer 2 is in the form of a film of a soft magnetic metal such as Ni-Fe, Fe-Al-Si or Co-based amorphous alloys and provides one of a pair of cores of the magnetic head. An upper magnetic core layer 3 is formed over the lower core layer 2. Like the lower layer 2, the upper core layer 3 is made of a soft magnetic metal film and serves as the other core of the magnetic head. Provided between the upper core layer 3 and the lower core layer 2 is an insulating layer 4 forming a thin magnetic gap 5 at the tip of the head and having an electrically conductive coil layer 6 embedded therein. The conductive coil 6 is in the form of a spiral coil extending continuously rightward in FIG. 3 and is shown in section of its one side. The two core layers 2, 3 are joined together at the portion C illustrated. The conductive coil layer 6 is made of a film of a conductor such as Cu, Al, Au or Ag. The insulating layer 4 is made of a film of a nonmagnetic material such as $SiO_2$, $Al_2O_3$ or $Si_3N_4$.

The thin film magnetic head is fabricated by forming over the substrate 1, the lower magnetic core layer 2 and the insulating layer 4 having a specified shape and embedding the conductive coil 6 as shown in FIG. 3 (b). Thereafter, the upper magnetic core layer 3 is formed in a vapor phase in a predetermined pattern over an area $\alpha$ to cover the magnetic gap 5 and the joint portion C (FIG. 3 (c)). Further the tip of the resulting assembly over a predetermined length $\beta$ is removed by grinding.

The upper magnetic core layer 3 is formed conventionally in the predetermined pattern, by the wet etching method, ion milling method or lift-off method.

When the wet etching method is resorted to, the upper core layer 3 is masked with a photoresist film and then etched in the predetermined pattern with an etching solution. This method has an advantage in that the layer can be etched in a short period of time without the necessity of using an expensive apparatus. The ion etching method is a physical etching method wherein the impact of Ar ion or a like inactive ion is used instead of the etching solution.

The lift-off method forms the upper magnetic core layer 3 in the predetermined pattern without etching.

The lift-off method will be described briefly with reference to FIGS. 4(a and b). To schematically illustrate this method FIGS. 4(a and b) show a case wherein the upper magnetic core layer 3 is formed directly on a substrate.

A photoresist film 12 is first formed on the substrate and then etched in a specified pattern, which is reverse to the pattern of the core layer 3 to be formed. Subsequently, an upper magnetic material layer 13 is formed over the entire upper surface obtained, to later provide the upper magnetic core layer 3. As seen in FIG. 4(a), therefore, the portion of the magnetic material layer 13 corresponding to the pattern of the upper core layer 3 to be formed, is formed directly on the substrate 11, with the other unnecessary portion thereof formed on the photoresist film 12. The substrate 11 is then immersed in its entirety in acetone or a like organic solvent, whereupon the organic solvent penetrates through the clearances (indicated by arrows A shown) between the magnetic material layer 13 on the substrate 11 and the magnetic material layer 13 on the photoresist film 12, to dissolve the photoresist film 12. With the dissolution of the photoresist film 12, the magnetic material layer 13 over the film 12 is separated off. The result is that the remaining portion of the upper magnetic material layer 13 provides the upper magnetic core layer 3 in the predetermined pattern as shown in FIG. 4(b).

With a trend in recent years toward higher-density magnetic recording, recording media with a high coercive force have been placed into use. For use with the recording media of high coercive force, there arises a need for thin film magnetic heads having sufficient ability to magnetize these media. Accordingly, in addition to the use of materials having a highly saturation magnetic flux density for the magnetic core layers 2, 3 of recent thin film magnetic heads, the upper magnetic core layer 3, which was about 1 to about 5 $\mu$m in thickness, is now made as thick as about 10 to about 30 $\mu$m and thereby prevented from magnetic saturation.

Nevertheless, the foregoing known methods of forming the upper magnetic core layer 3 encounter the following problems when the layer has such a large thickness.

(1) When such a thick core layer 3 is to be patterned by the wet etching method, the amount of side etching increases. This presents difficulties in controlling the width of the core layer 3 with a high accuracy. Consequently, it is impossible to reduce the track width to about 10 to about 20 $\mu$m as required in recent years, and to determine the width with a tolerance of $\pm 1$ to 2 $\mu$m.

(2) The ion milling method does not permit selective etching for the upper magnetic core layer 3 because of its nature as a physical etching method. Further, the photo-resist film, serving as a mask, and the insulating layer 4, are always etched with the core layer 3.

Accordingly, when a thick upper magnetic core layer 3 is to be etched, there arises a need to form a photoresist film of larger thickness. This is difficult to form. Even if it is possible to form the thicker photoresist film, extreme difficulties are encountered in patterning the film with high accuracy and in forming the core layer 3 with high accuracy.

Further in the actual etching step, the core layer 3 is slightly overetched so as to cancel any influence by variations in the thickness in the layer 3 and in the etching rate from portion to portion. The degree of overetching poses no problem when the core layer is several micrometers in thickness, but produces an unnegligible influence if the thickness is as large as 10 to 30 μm. More specifically, it is likely that the etching is continued even after the core layer 3 has been etched through the entire thickness thereof, possibly removing the insulating layer 4. This results in objections such as exposure of or damage to the conductive coil layer 6 and a break in this layer 6.

(3) The lift-off method is free of the above drawbacks since the upper magnetic material layer 13 is not etched in this method. However, it is required that the photoresist film formed be eventually removable by dissolving with an organic solvent, whereas when subjected to a high temperature, the photoresist film is liable to change into a film which is sparingly soluble with the organic solvent. Accordingly, if the photoresist film formed is heated to a high temperature (for example, of not lower than 150° C.), the film becomes unremovable or less-removable by dissolving in the final step.

When the magnetic material layer is to be formed in a vapor phase, therefore, the substrate temperature must be lower than usually (e.g. lower than 100° C.). However, the lower substrate temperature reduces the adhesion of the magnetic core layer to the underlying layer and entails impaired magnetic characteristics.

Furthermore, some kinds of photoresist films as formed are inherently sparingly soluble with a conventional organic solvent and are thus not suitable for the lift-off method.

The present invention has been accomplished in view of the foregoing situation, especially to overcome the problems involved in the fabrication of thin film magnetic heads utilizing the lift-off method.

Incidentally, proposals have already been made in the field of production of semiconductors to use plasma etching in place of the organic solvent used for the lift-off method for removing the photoresist film (Unexamined Japanese Patent Publication No. SHO 52-100983; J. Vac. Sci. Technol., 19(4), pp. 1324-1328, Nov./Dec. 1981). Nevertheless, nothing whatsoever is known as to the application thereof to the fabrication of thin film magnetic heads or the expected effect thereof.

SUMMARY OF THE INVENTION

Accordingly, the present invention provides a process for producing a thin film magnetic head including forming a nonmagnetic material layer over a lower magnetic core layer with an electrically conductive coil layer incorporated in the nonmagnetic material layer, and forming an upper magnetic core layer of a predetermined pattern over the resultant to provide the thin film magnetic head. The upper magnetic core layer of the predetermined pattern is formed by the steps of:

(a) forming a resin film over an area including and wider than the area of the predetermined pattern;
(b) etching the resin film to form a resin film pattern which is the reverse of the predetermined pattern,
(c) forming a layer of magnetic material over the resin film pattern; and
(d) subjecting the resultant to plasma etching, using an oxygen-containing gas to remove the resin film pattern for the removal of the portion of the magnetic material on the resin film and thereby leave the magnetic material layer in the pre-determined pattern.

With the production process of the present invention, the pattern of the upper magnetic core layer is formed by the lift-off method. The most distinct feature of the present process is that in the lift-off method, the resin film is removed by plasma etching.

The present invention has been accomplished based on the finding that the resin film, even if sparingly soluble with organic solvents, can be efficiently removed by plasma etching in the manner of side etching. This thereby permits vapor-phase formation of the upper magnetic core layer at a high temperature and consequently enables this core layer to exhibit excellent magnetic characteristics.

The process of the invention therefore has the following advantages.

(1) The upper magnetic core layer itself is not etched, unlike the wet etching method, so that this core layer, which is thick, can be patterned with higher accuracy.

(2) Unlike the ion milling method, the resin film can be selectively removed. This eliminates the need to form a photoresist film having a larger thickness than the thick upper magnetic core layer. This further obviates the likelihood of causing damage to the conductive coil layer.

(3) No organic solvent is used for dissolving the resin film unlike the conventional lift-off method. This obviates the likelihood that the resin film cannot be removed completely owing to the influence of the heat used for forming the upper magnetic material layer. Moreover, the magnetic material layer can be formed at a sufficiently high substrate temperature when so required. This assures the upper magnetic core layer of improved adhesion to the underlying layer, thus enabling the core layer to exhibit satisfactory magnetic characteristics.

DESCRIPTION OF THE PREFERRED EMBODIMENT

Figure 1A:
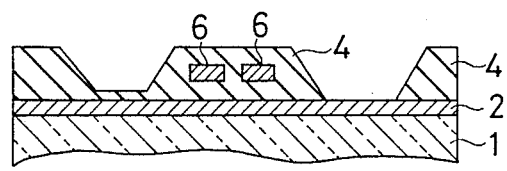
FIGS. 1(a) to (e) are fragmentary view in a vertical section showing stepwise, a production process embodying the invention.
Figure 1B:
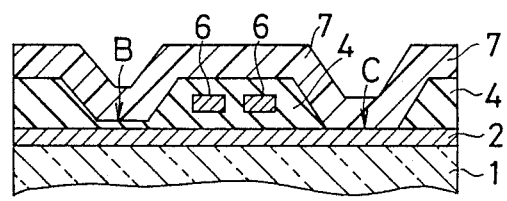

With the production process of the present invention, the lower magnetic core layer is usually formed on a substrate of a nonmagnetic or magnetic material having high wear resistance, such as ferrite, alumina or glass. The lower magnetic core layer is prepared preferably from a soft magnetic metal such as Ni-Fe, Fe-Al-Si or a like iron alloy or a cobalt amorphous alloy by a known method such as electroplating, vacuum evaporation, sputtering or the like.

The substrate of a magnetic material can be used as a combined substrate and lower magnetic core layer.

The conductive coil layer is made preferably of a conductive metal such as Cu, Al, Au or Ag. The nonmagnetic material layer having the conductive coil layer embedded therein and providing a magnetic gas at the tip of the head and a magnetic head connecting opening is prepared preferably from an insulating material such as $SiO_2$, $Al_2O_3$ or $Si_3N_4$. The conductive coil layer and the nonmagnetic material layer can be formed and patterned by a known method.

The upper magnetic core layer is formed over the nonmagnetic material layer by the foregoing steps (a) to (d).

First in step (a), a resin film is formed. The material to be used for forming the resin film is one which will not decompose or melt during the step of forming the magnetic material layer to be described later. Examples of suitable materials are resins amenable to thermal sintering processes, such as polyimide resins and polyimido-siloxane resins, photosensitive resins for use in the electronics industry, UV resists, Deep-UV resists, resins curable with electron beams or X-rays etc. More specifically, examples of useful polyimide or polyimido-siloxane resins are PIQ or PIX series (products of Hitachi Chemical Co., Ltd., Japan), Du Pont PYRALIN series and SP series (Toray Industries, Inc., Japan). Examples of useful photosensitive resins are PIL series (Hitachi Chemical Co., Ltd.) and examples of useful UV resists, etc. are Hoechst AZ series, OMR series (Tokyo Ohyokagaku Co., Ltd., Japan), Hunt Chemical Waycoat series and the like. The thickness of the resin film is suitably about a half to 2 times thickness of the upper magnetic core layer to be formed. In the case of the polyimide film, for example, the thickness is suitably 5 to 50 $\mu$m, preferably 10 to 30 $\mu$m, in view of the plasma etching rate. The resin film need not always be cured or sintered, or it may be cured or sintered to such an extent that it becomes insoluble with organic solvents. The film can be formed by a known method such as a coating, dipping or spinner method.

In step (b), the resin film is patterned. The pattern is reverse to the pattern of the upper magnetic core layer to be formed. The film can be patterned by forming or applying a specified mask.

In step (c), a magnetic material layer is formed over the resin film pattern. It is suitable to prepare the magnetic material layer from a soft magnetic metal, such as Ni-Fe, Fe-Al-Si or cobalt-based amorphous alloy, already mentioned. The layer can be formed by a known method such as electroplating, vacuum evaporation or sputtering. In forming the magnetic material layer, it is desirable to control the substrate temperature to a high temperature of 100° to 400° C. in view of the adhesion of the layer to the underlying layer and the magnetic characteristics thereof. Such a high temperature, if applied, causes no trouble to the subsequent step. The thickness of the layer, which is not limited specifically, can be about 5 to about 50 $\mu$m, preferably about 10 to about 30 $\mu$m.

The area over which the magnetic material layer is to be formed needs to be such that the layer at least entirely covers the pattern of the upper magnetic core layer to be formed, and may be part of the resin film formed area. Especially in the case where a plurality of magnetic heads are to be fabricated on a single substrate, it is suitable to use a continuous resin pattern. Therefore, and therefore the upper magnetic core layers for the individual heads are each formed locally on the resin film. In this case, the magnetic material layer may be formed over the required areas only. Alternatively, the upper surface of the resin film may be entirely covered with the magnetic material layer first, and the undersized portions may then be etched away. The magnetic material layer thus formed completely covers each opening in the resin film pattern which defines the pattern of the upper magnetic core layer and leaves the resin film locally exposed without completely covering the entire upper surface of the resin film.

The substrate bearing the magnetic material layer thus formed is subjected to plasma etching in step (d). The plasma etching step is performed in an atmosphere of oxygen-containing gas. Examples of useful oxygen-containing gases as pure $O_2$ gas, 10% $N_2$—$O_2$ gas and the like. To ensure a stabilized glow discharge and efficient ashing, the gas may contain $H_2O$, $H_2$, $CH_4$ and the like. $CF_4$, $C_2F_6$ and the like may also be present in the gas.

It is suitable that the gas pressure be 0.1 to several torr, and that the power for the glow discharge be usually 200 to 400 W.

The resin film beneath the magnetic material layer is etched away by the plasma etching step in the manner of side etching through the clearance between the magnetic material layer and the resin film and through the exposed side portions of the resin film. Consequently, only the portion of the magnetic material layer on the resin film is removed to completely form an upper magnetic core layer in the predetermined pattern.

Figure 3A:
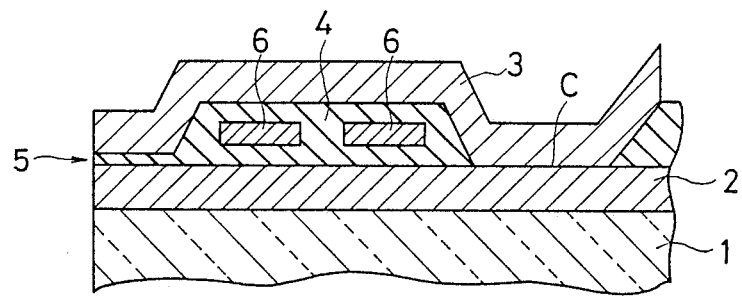
FIGS. 3(a) to (c) are fragmentary views in a vertical section illustrating a typical example of thin film magnetic head and a conventional process for producing the same.
Figure 3B:
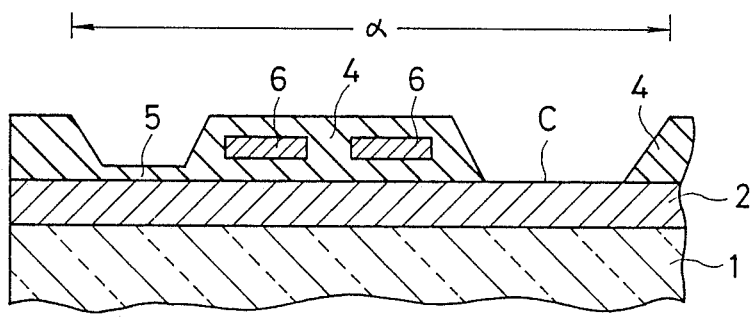
Figure 3C:
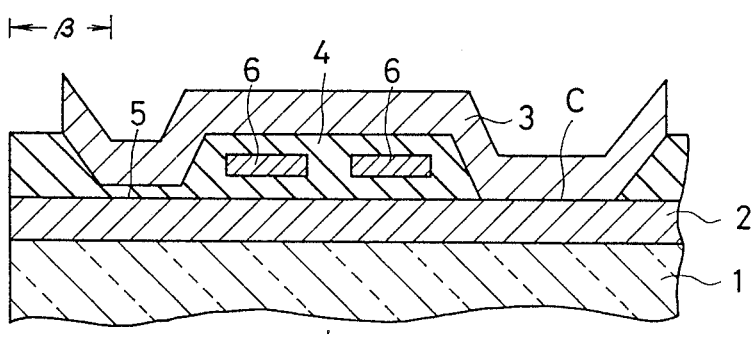
Figure 4A:
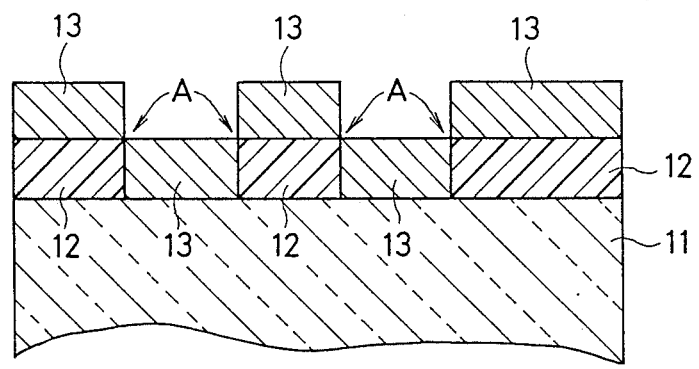
FIGS. 4(a and b) are views in a vertical section for illustrating the conventional lift-off method.
Figure 4B:
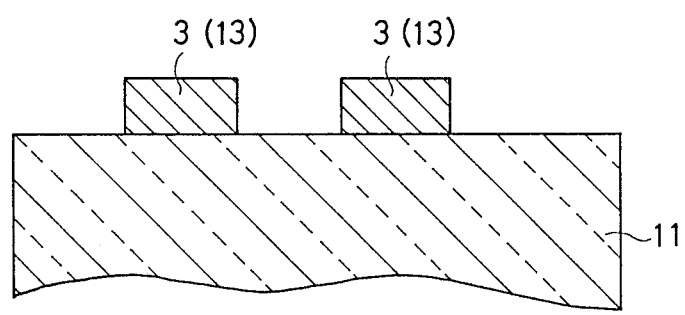

The thin film magnetic head thus obtained has its tip ground as seen in FIG. 3 before use.

EXAMPLE

An embodiment of the invention will be described with reference to FIGS. 1 and 2.

The embodiment will be described as a process for producing thin film magnetic heads including a coil and having the construction shown in FIG. 3 as already described.

First, a lower magnetic core layer 2 is formed over the entire upper surface of a substrate as seen in FIG. 1 (a). With this embodiment, the core layer 2 is an Fe-Al-Si film having a thickness of 3 $\mu$m and formed by a sputtering method (at a substrate temperature of 250° C.). The substrate is made of Mn-Zn Ferrite.

Next, an insulating layer 4 and a conductive coil layer 6 are formed, each in a specified pattern and with a specified thickness, over the lower magnetic core layer 2. More specifically, a lower layer portion of the insulating layer 4 is formed over the entire surface of the core layer 2, the coil layer 6 is formed in a spiral pattern as specified on the layer portion, and an upper layer portion of the insulating layer 4 is formed over the entire upper surface obtained. In FIG. 1, the coil layer 6 is shown in vertical section of its one side only. At a front gap portion B and a joint portion C positioned at opposite sides of the illustrated side portion of the coil layer 6, the insulating layer 4 is partially etched away by a taper etching method, i.e., reactive ion etching (RIE). At the front gap portion B where the layer 4 is etched away, a thin insulating layer is formed again for providing a magnetic gap 5 as shown in FIG. 1(a). These insulating layers are each in the form of an $SiO_2$ film formed by plasma CVD. The layer 4 is 4 $\mu$m in thickness, and the magnetic gap is 0.3 $\mu$m. The conductive coil 6 comprises a Cu film formed by vacuum evaporation.

After the insulating layer 4 and the conductive coil layer 6 have been formed, a resin film 7 is formed over the entire upper surface obtained as seen in FIG. 19b). The resin film 7 comprises a polyimide (PIQ 3200, Hitachi Chemical Co., Ltd.) film having a thickness of about 15 μm and formed by coating and baking at 300° to 400° C. Alternatively, the resin film 7 may be a photo-resist film which is baked at a temperature higher than is usual, i.e., at least 150° to at least 200° C. The preferred thickness of the resin film 7 can be determined suitably according to the thickness of the upper magnetic material layer 8 to be formed later, the condition for the subsequent plasma etching, etc.

Besides the above methods, the resin film 7 can also be formed by the so-called positive-negative process, i.e., by locally removing a polyimide film thus formed is made of a precusor for polyimide resin, since it has not been baked. As another method, a photosensitive polyimide resist is also usable. Thus, the method of forming the film 7 is not limited specifically.

Figure 1C:
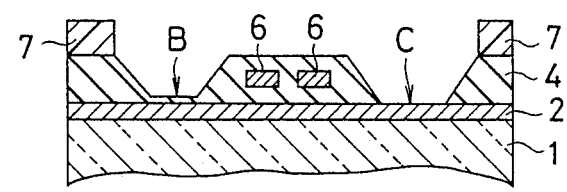

The resin film 7 is etched to a specified pattern as seen in FIG. 1(c) by forming a mask in the specified pattern from a material resistant to oxygen plasma, such as Cu, Al or SiO$_2$ (Cu is used in the present case) and resorting to reactive ion etching with use of oxygen gas. The pattern of the resin film 7 is reverse to the pattern of the upper magnetic core layer 3, to be formed later. Accordingly, the resin film 7 leaves exposed the portion where the core layer 3 is to be formed. The mask used for etching the resin film 7 is thereafter removed.

Figure 1D:
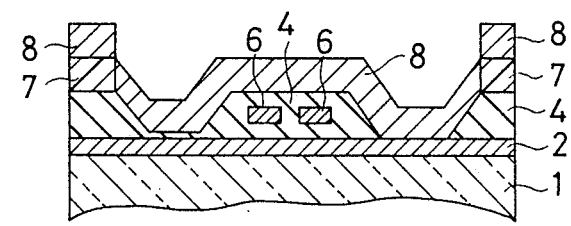

After the resin film 7 has been completely etched in this way, an upper magnetic material layer 8 is formed over the specified area of the resulting upper surface as seen in FIG. 1(d). The layer 8 provides an upper magnetic core layer 3 later and comprises an Fe-Al-Si film having a thickness of about 15 μm. The layer 8 is formed by sputtering method at a substrate temperature of about 250° C.

Figure 2:
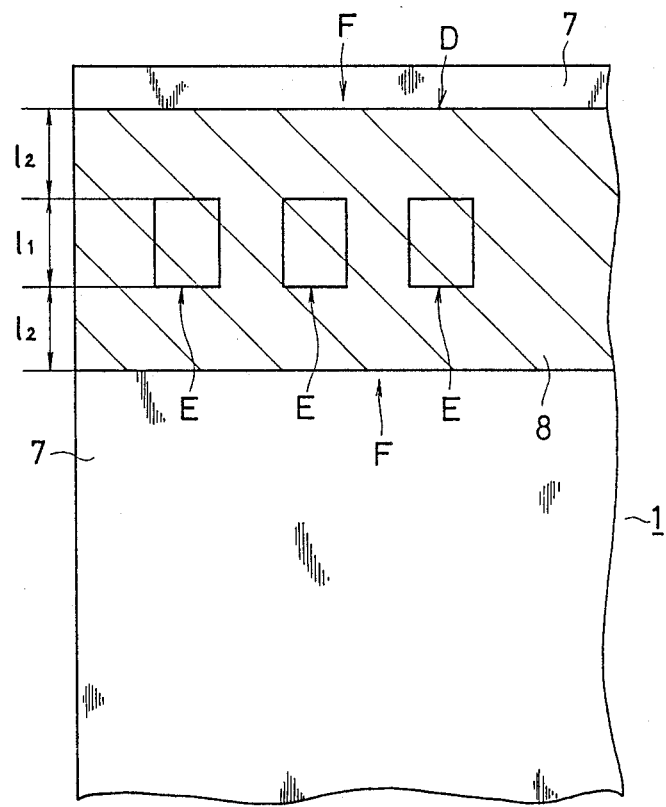
FIG. 2 is a plan view for illustrating the area where a magnetic material layer is formed by the process.

FIG. 2 is a plan view showing the area where the upper magnetic material layer 8 is formed for mass production. Indicated at E, E, . . . in the drawing are areas where the upper magnetic core layer is to be formed for thin film magnetic heads individually, each of which corresponds to the aforementioned opening in the resin film. Further the hatched portion D represents the area where the magnetic material layer 8 is formed. With the present embodiment, $l_1 = 100$ μm, and $l_2 = 100$ μm. Preferably, $l_1$ is usually 100 to 500 μm, and $l_2$ is usually up to 300 μm. The area D covers all the openings E in the resin film 7 and covers the upper surface of the resin film 7 only partially.

The pattern of magnetic material layer is formed over the area D by forming the layer over the entire upper surface of the resin film and thereafter etching the layer using an HCl-HNO$_3$ etching solution. Alternatively, the magnetic material layer 8 can be formed in conformity with the configuration of the specified area D by sputtering or vacuum evaporation with use of a mask, but without resorting to etching.

Consequently, the portion of the magnetic material layer 8 providing the upper magnetic core layer 3 is formed in the opening E over the lower magnetic core layer 2 and the insulating layer 4, while the unnecessary portion is formed directly on the resin film 7.

Next, the resin film 7 is removed by plasma etching. With the present embodiment, the plasma etching step is performed using oxygen gas and a hollow cylindrical plasma etching device at an oxygen pressure of 0.8 torr with application of power of 400 W. When the etching operation is conducted for 10 hours under this condition, the polyimide film is etched away sidewise over a distance of 100 to 150 μm when having a thickness of 15 μm, or over a distance of 50 to 100 μm when having a thickness of 10 μm. With the present embodiment, therefore, the side etching of the resin film 7 can be completed in 10 hours. Thus, the unnecessary portion of the upper magnetic material layer 8 over the film 7 can be removed (FIG. 1(e)).

With the process of the invention, as will be apparent from the present embodiment, the resin film can be etched away sidewise in the direction of arrow F shown in FIG. 2 from one end of the specified area D. This is so that the etching proceeds at an increased rate, while the amount of etching can be smaller. Further when the plasma etching process is resorted to using such an oxygen-containing reactive gas, the resin layer 7 can be removed completely even if the upper magnetic material layer 8 is formed at an elevated substrate temperature.

Since an SiO$_2$ film formed by the plasma CVD process serves as the insulating (nonmagnetic material) layer 4 beneath the resin layer 7 according to the present embodiment, oxygen gas only is used as the reactive gas for the plasma etching process, whereas if a CF$_x$—O$_2$ reactive gas is used for the plasma etching process, the resin film 7 can be etched at a further higher rate. In this case, however, there arises a need to form a film of Cu, Al, Ni, Fe or the like beneath the resin film 7 or to prepare the insulating layer 4 from Al$_2$O$_3$ or the like to provide resistance for the insulating layer to the CF$_x$—O$_2$ reactive gas.

Figure 1E:
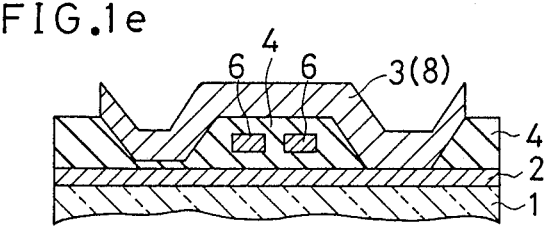

The thin film magnetic head (FIG. 1(e)) obtained by removing the unnecessary portion of the magnetic material layer 8 from the upper surface of the resin film 7 in this way has its forward end portion (left end edge shown) to be removed by grinding and is used in the form shown in FIG. 3 for various applications.

What we claimed is:

1. A process for producing a thin film magnetic head by forming a nonmagnetic material layer over a lower magnetic core layer with an electrically conductive coil layer embedded in the nonmagnetic material layer, and forming an upper magnetic core layer of a predetermined pattern over the resultant to provide the thin film magnetic head, the upper magnetic core layer of the predetermined pattern being formed by the steps of:
    (a) forming a resin film over an area including and wider than the area of the predetermined pattern;
    (b) etching the resin film to form a resin film pattern, reverse to that of the predetermined pattern;
    (c) forming a layer of magnetic material over the resin film pattern to thereby form a resultant; and
    (d) subjecting the resultant to plasma etching using an oxygen-containing gas, to remove both resin film remaining from step (b) and the magnetic material previously formed on the remaining resin film to thereby leave a magnetic material layer in the predetermined pattern.

2. The process of claim wherein the resin film is made of a polyimide resin, a polyimido-siloxane resin, a photosensitive resin, a UV resist, a Deep-UV resist or a curable resin with electron beams or x-rays.

3. The process of claim 1 wherein the resin film has a thickness of about a half to 2 times the thickness of the upper magnetic core layer to be formed.

4. The process of claim 1 wherein the resin film has a thickness of 5 to 50 μm.

5. The process of claim 1 wherein the resin film has a thickness of 10 to 30 μm.

6. The process of claim 1 wherein the layer of magnetic material is made of an iron alloy such as Ni-Fe or Fe-Al-Si, or an cobalt-based amorphous alloy.

7. The process of claim 1 wherein the layer of magnetic material is formed by electroplating, vacuum evaporation or sputtering under a substrate temperature of 100° C. to 400° C.

8. The process of claim 1 wherein the layer of magnetic material has a thickness of 5 to 50 μm.

9. The process of claim 1 wherein the layer of magnetic material has a thickness of 10 to 30 μm.

10. The process of claim 1 wherein the plasma etching is effected under a pressure of 0.1 to several torr.

11. The process of claim 1 wherein the oxygen-containing gas is composed of pure $O_2$ gas or $N_2$—$O_2$ gas, optionally containing $H_2O$, $H_2$, $CH_4$, $CF_4$ or $C_2F_6$.

12. The process of claim 1 wherein the lower magnetic core layer is one formed over a substrate of a material having high wear resistance.

13. The process of claim 1 wherein the nonmagnetic material layer is made of an insulating material such as $SiO_2$, $Al_2O_3$ or $Si_3N_4$.

14. The process of claim 1 wherein the nonmagnetic material layer provides a magnetic gap for the head and a magnetic head connecting opening.

15. The process of claim 1 wherein the coil layer is made of a conductive material such as Cu, Al, Au or Ag.

16. The process of claim 1 wherein the layer of magnetic material is partially formed over the resin film pattern formed area covering an opening of the resin film pattern.

* * * * *